United States Patent [19]

Toth

[11] Patent Number: 5,105,559
[45] Date of Patent: Apr. 21, 1992

[54] FLOW-SEAL FLUIDIZATION NOZZLE AND A FLUIDIZED BED SYSTEM UTILIZING SAME

[75] Inventor: Stephen J. Toth, Clinton Township, Hunterdon County, N.J.

[73] Assignee: Foster Wheeler Energy Corporation, Clinton, N.J.

[21] Appl. No.: 486,683

[22] Filed: Mar. 1, 1990

[51] Int. Cl.⁵ ............................................. F26B 17/00
[52] U.S. Cl. ..................................... 34/57 B; 34/57 R; 432/58
[58] Field of Search ............... 34/57 A, 57 B, 57 R, 34/10; 432/58, 15

[56] References Cited

U.S. PATENT DOCUMENTS

| | | |
|---|---|---|
| 4,335,661 | 6/1982 | Stewart et al. . |
| 4,349,969 | 9/1982 | Stewart et al. . |
| 4,397,102 | 8/1983 | Gamble et al. . |
| 4,436,507 | 3/1984 | Stewart et al. . |
| 4,446,629 | 5/1984 | Stewart et al. . |
| 4,460,330 | 7/1984 | Asai et al. ............................ 34/57 B |
| 4,521,976 | 6/1985 | Stewart et al. . |
| 4,574,496 | 3/1986 | Sedlacek ............................. 34/57 A |
| 4,841,884 | 6/1989 | Engstrom et al. .................. 34/57 A |

FOREIGN PATENT DOCUMENTS

| | | |
|---|---|---|
| 53-118870 | 10/1978 | Japan . |
| 8101701 | 11/1981 | Netherlands ....................... 34/57 A |

Primary Examiner—Henry A. Bennet
Attorney, Agent, or Firm—Marvin A. Naigur

[57] ABSTRACT

A fluidized bed system in which a plate is disposed in an enclosure and is adapted to support particulate material. A plurality of nozzles are supported by the plate for receiving air and directing the air through the plate and into the particulate material to fluidize same. Each of the nozzles comprises a vertical portion extending upwardly from the plate for receiving air from the plenum and a horizontal portion extending below the upper portion of the vertical portion for discharging the air.

15 Claims, 2 Drawing Sheets

FLOW-SEAL FLUIDIZATION NOZZLE AND A FLUIDIZED BED SYSTEM UTILIZING SAME

BACKGROUND OF THE INVENTION

This invention relates to a fluidized nozzle and a fluidized bed system utilizing same and, more particularly, to such a nozzle and system in which a bed of particulate material in an enclosed space is fluidized by the introduction of air into the bed through the nozzle.

Fluidized bed reactors, such as gasifiers, steam generators, combustors, and the like, are well known. In these arrangements, pressurized air or other fluidizing media is passed, via a plurality of nozzles, through a bed of particulate material, including a fossil fuel such as coal and an adsorbent for the sulfur generated as a result of combustion of the coal, to fluidize the bed and to promote the combustion of the fuel at a relatively low temperature. The entrained particulate solids are separated externally of the bed and recycled back into the bed. The heat produced by the fluidized bed is utilized in various applications such as the generation of steam, which results in an attractive combination of high heat release, high sulfur adsorption, low nitrogen oxides emissions and fuel flexibility.

The most typical fluidized bed reactor is commonly referred to as a "bubbling" fluidized bed in which the bed of particulate material has a relatively high density and a well-defined, or discrete, upper surface.

Other types of fluidized bed reactors utilize a "circulating" fluidized bed. According to these processes, the fluidized bed density is well below that of a typical bubbling fluidized bed, the air velocity is greater than that of a bubbling bed and the air entrains a substantial amount of particulate solids and is substantially saturated therewith.

In both the bubbling and circulating fluidized bed arrangements, an air plenum is disposed below an air distributor plate, or grid, for supplying pressurized air to a plurality of air nozzles supported by the plate. The nozzles extend above the plate and into the bed and discharge the air into the bed.

However, the solids from the bed can backflow through the nozzles and into the air plenum especially in connection with circulating fluidized beds when the unit is suddenly shut down while operating at full loads. As a result, the solids will accumulate in the air plenum and block air flow through the nozzles. In order to minimize the backflow, the nozzles have to be designed with great care to arrive at the best discharge angle associated with the nozzle diameter, length, bed material characteristics, etc. This is time consuming and expensive, and adds to the overall costs of the system.

This problem is compounded when the discharge angle and direction of the nozzle is especially critical, such as in fluidized beds utilizing directional and/or differential bed fluidization such as disclosed in U. S. Pat. No. 4,397,102 issued Aug. 9, 1983 and assigned to the same assignee as the present invention.

SUMMARY OF THE INVENTION

It is therefore an object of the present invention to provide a fluidization nozzle which introduces air or other fluidizing medium from a plenum into an enclosure containing a bed or particulate material.

It is a further object of the present invention to provide a nozzle of the above type which is designed to reduce or eliminate the backflow of bed materials from the fluidized bed to the air plenum.

It is a further object of the present invention to provide a nozzle of the above type which, upon unit shutdown and particulate material defluidization, provides a flowpath of sufficient length, angle, and flow characteristics to establish a seal so that said defluidizing particulate material is prevented from flowing back through the nozzle and into the air plenum.

It is a further object of the present invention to provide a fluidized bed system utilizing a plurality of nozzles of the above type.

Toward the fulfillment of these and other objects, the fluidization nozzle of the present invention is mounted on a distributor plate which supports a bed of particulate material and receives air flow from a plenum located below the plate. The nozzle includes a vertical portion for receiving the air and a horizontal portion for discharging the air and is designed to establish an internal air flow path from its inlet which changes in direction over a relatively large angle and an outlet which is substantially horizontal.

DESCRIPTION OF THE DRAWINGS

The above brief description, as well as further objects, features and advantages of the present invention will be more fully appreciated by reference to the following detailed description of the presently preferred but nonetheless illustrative embodiment in accordance with the present invention when taken in conjunction with the accompanying drawings in which.

DESCRIPTION OF THE PREFERRED EMBODIMENT

Figure 1:
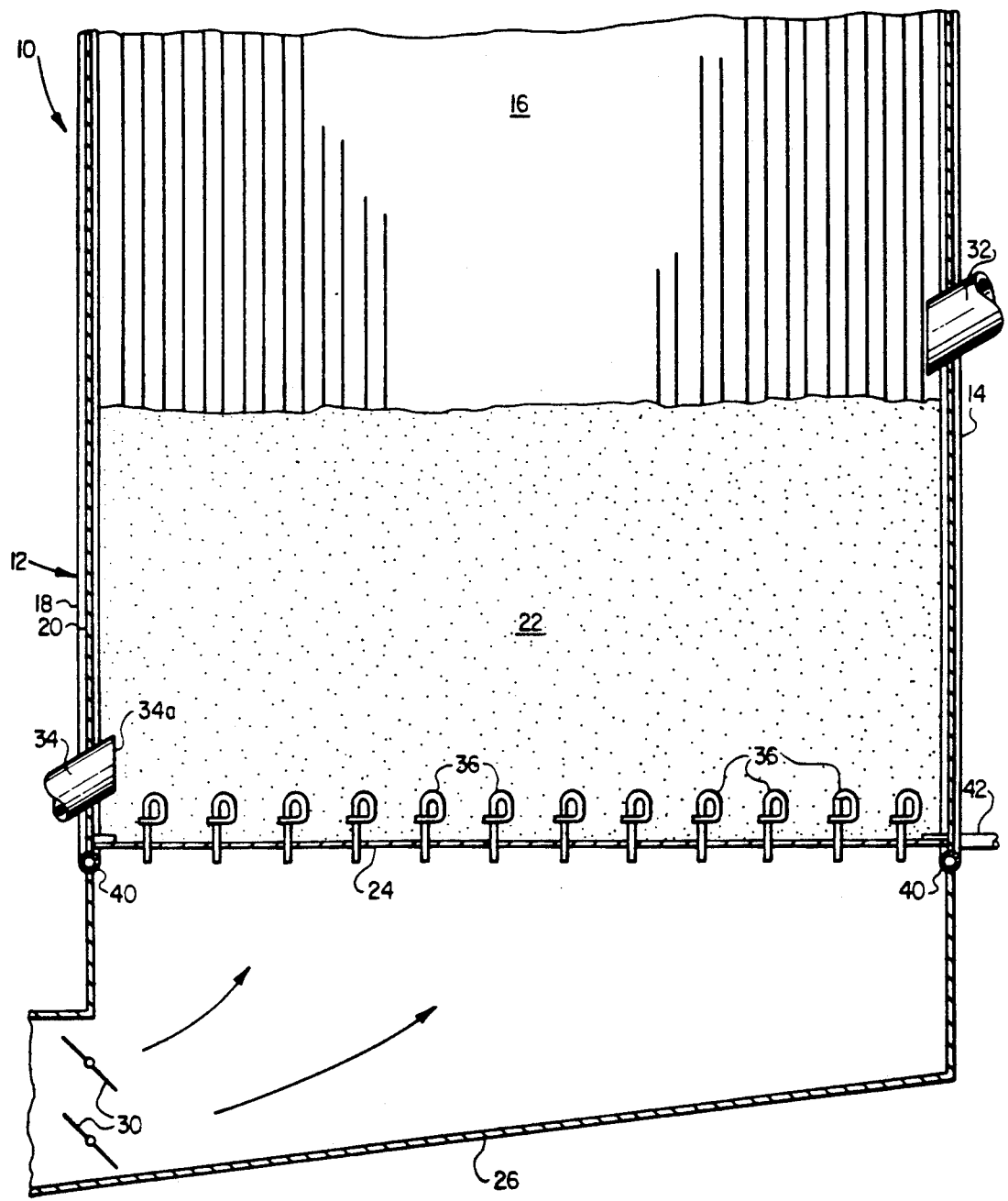
FIG. 1 is a vertical sectional view of a fluidized bed heat exchanger depicting a plurality of fluidizing nozzles of the present invention.

The fluidization nozzle of the present invention will be described in connection with a heat exchanger in the form of a boiler, a combustor, a process reactor or any similar type device utilizing a bubbling fluidized bed. The heat exchanger includes an enclosure 10 consisting of a front wall 12, a rear wall 14, and two sidewalls, one of which is shown by the reference numeral 16. Each wall may be formed by a plurality of vertically-extending tubes 18 disposed in a spaced, parallel relationship and connected together by a plurality of elongated fins 20 extending for the entire lengths of the tubes and connected to diametrically opposed surfaces of the tubes in a conventional manner. The upper portion of the enclosure 10 is not shown for the convenience of presentation, it being understood that it consists of a convection section, a roof and an outlet for allowing the combustion gases to discharge, also in a conventional manner.

A bed of particulate material, shown in general by the reference numeral 22, is disposed within the enclosure 10 and rests on a perforated plate or grid 24 extending horizontally in the lower portion of the enclosure. The bed 22 can consist of a mixture of discrete particles of fuel material such as bituminous coal, and an adsorbent, such as limestone, for adsorbing the sulfur released by the combustion of the fuel material.

An air plenum 26 is provided immediately below the plate 24 and an inlet 28 is provided through the plenum for distributing pressurized air from an external source (not shown) to the plenum under the control of a pair of dampers 30.

An overbed feeder 32 extends through the rear wall 14, receives particulate coal from inlet ducts or the like (not shown), and is adapted to feed the coal particles onto the upper surface of the bed 22. The feeder 32 can operate by gravity discharge or can be in the form of a spreader-type feeder or any other similar device. It is understood that a feeder can also be provided for discharging the adsorbent onto the bed 22, and would be constructed and arranged in a manner similar to the feeder 32.

A drain pipe 34 extends through the front wall 12 and has an inlet end portion 34a that registors with the interior of the enclosure 10 in communication with the lower portion of the bed 22. The pipe 34 is thus adapted to receive the spent bed material and functions to discharge the material from the enclosure 10 by gravity to a screw cooler, conveyor belt, or the like (not shown).

It is understood that a bed light-off burner (not shown) is provided for initially lighting off the bed during startup in a conventional manner.

A pair of horizontal headers 40 are connected in fluid communication with the tubes 18 forming the front wall 12 and the rear wall 14, respectively, and another horizontal header 42 is connected in fluid communication with the tubes 18 forming the sidewalls 16. It is understood that similar headers are provided in communication with both ends of the other sidewall and the upper ends of the walls 12 and 14. As a result, a fluid to be heated can be sequentially or simultaneously passed through the walls 12, 14 and 16 to pick up the heat from the fluidized bed in a conventional manner.

A plurality of fluidization nozzles, referred to in general by the reference numeral 36, extend through, and are supported by, the plate 24. The upper portion of each nozzle 36 extending above the plate 24 is bent into a substantially "P" shape to form a horizontally extending discharge portion, as will be described in detail later.

Thus, the air from the plenum 26 enters the vertical portion of each nozzle 36 and discharges from the horizontal portion thereof into the bed 22. The velocity of the air from the nozzles is such that the bed material extending above the horizontal nozzle portions is fluidized, and the air passes through the bed and rises, by convection, in the enclosure 10 before discharging, along with the gaseous products of combustion, from an outlet (not shown) in the upper portion of the enclosure. Also, a dormant layer of particulate material is formed around the nozzles 36 which acts to insulate the plate 24 from the heat generated in the heat exchanger extending above the nozzles 36.

Figure 2:
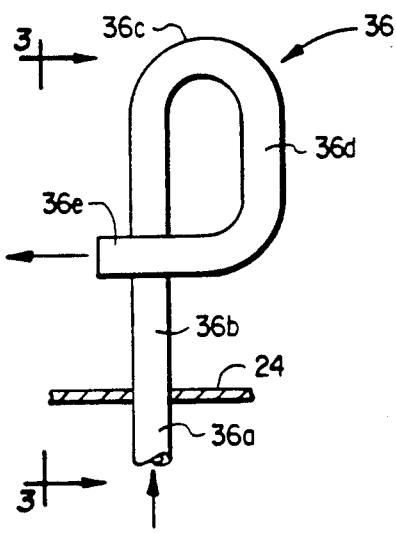
FIG. 2 is an enlarged, front elevational, view depicting a fluidizing nozzle of FIG. 1, with the bed material omitted in the interest of clarity.
Figure 3:
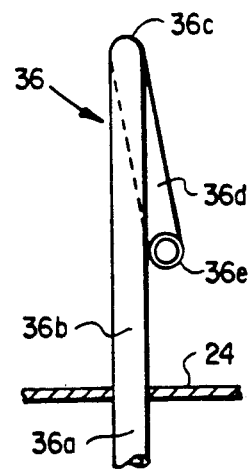
FIG. 3 is a cross-sectional view taken along the lines 3—3 of FIG. 2.

The details of a nozzle 36 are shown in FIGS. 2 and 3. More particularly, each nozzle 36 includes a vertical portion extending through a corresponding opening in the plate 24 and secured to the plate in any conventional manner such as by welding. The vertical portion of the nozzle 36 includes a lower portion 36a projecting below the plate for receiving air from the plenum 26, and an upper portion 36b extending above the plate and into the fluidized bed 22. The upper portion 36b is bent downwardly and horizontally to form a curved portion 36c, a vertical portion 36d and a horizontal discharge portion 36e. Thus, air travels upwardly through the vertical portions 36a, 36b, around the curved portion 36c, through the vertical portion 36d, and to the horizontal portion 36e before discharging in a direction parallel to the plate 24. As shown in FIG. 3, the curved portion 36c is bent out of the plane of the drawing of FIG. 2 so that the horizontal portion 36e passes adjacent the vertical portion 36b.

In operation, the dampers 30 associated with the air plenum 26 are opened and pressurized air passes up through the plenum and into the ends of the vertical portion 36a of each nozzle 36. The air flows upwardly through the vertical portions 36a and 36b, through the curved portion 36c, the vertical portion 36d and the horizontal portion 36e before discharging into the bed 22 in a plane parallel to and above the plane of the plate 24. The air passes through the bed to fluidize it and the passes, by convection, through the enclosure 10 in a generally upwardly direction. Thus, that portion of the particulate material in the bed 22 extending immediately above the horizontal portion of the nozzles 36 is fluidized and the portion extending between the horizontal portion and the upper surface of the plate 24 remains dormant, or stagnant.

As shown in FIG. 1, the nozzles 36 are oriented so that their horizontal discharge portions 36e are directed towards the front wall 12. Although not clear from the drawing, it is understood that the latter discharge portions can also be directed towards the drain pipe 34. As a result of the orientation, a momentum is imparted to the bed material which induces a circulation of the material to insure superior distribution, mixing and draining of the particulate material as discussed in detail in the aforementioned U.S. patent.

The light-off burner is then fired to heat the material in the bed until the temperature of the material reaches a predetermined level, and additional particulate fuel is discharged from the feeder 32 while adsorbent material is discharged onto the upper surface of the bed 22 as needed.

After the bed 22 has been fluidized and has reached a predetermined elevated temperature in accordance with the foregoing, the light-off burner 38 is turned off while the feeder 32 continues to distribute particulate fuel to the upper surface of the bed in accordance with predetermined feed rates.

Fluid, such as water, to be heated is passed into the headers 40 and 42 where it passes simultaneously, or in sequence, through the tubes 18 forming the walls 12, 14 and 16 to add heat from the fluidized bed to the fluid before it is passed to external apparatus for further processing.

As a result of the foregoing, backflow of the bed material from the bed 22, through the nozzles 36 and into the plenum 26 is prevented due to the seal provided by the nozzles as a result of a relatively long flow path through each nozzle which changes in direction over a relatively large angle, and terminates in a horizontal discharge angle. Also, an improved mixing and distribution of the particulate material is achieved due to the momentum imparted to the bed material and the improved circulation of the latter within the bed. Also, the dormant layer of particulate material extending between the upper surface of the plate 24 and the horizontal portions of the nozzles 36 acts to insulate the plate 24.

It is understood that the fluidization nozzles 36 can take a different configuration from that discussed above, and the number and specific locations of the nozzles and their specific orientation can be varied as long as the above objectives and results are achieved. For example, FIGS. 4 and 5 of the drawings depict an alternate embodiment of the nozzle of the present invention, which is referred to in general by the reference numeral 50.

Figure 4:
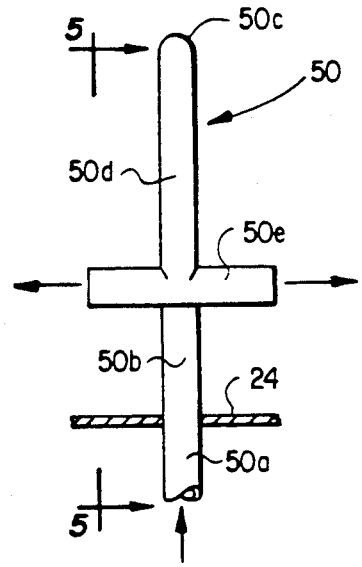
FIGS. 4 and 6 are views similar to FIG. 2, but depicting alternate embodiments of the nozzle of the present invention.
Figure 5:
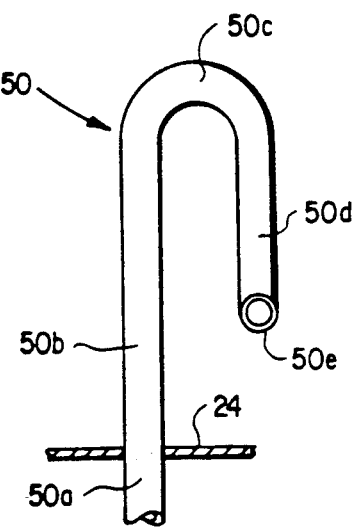
FIGS. 5 and 7 are cross-section views taken along the lines 5—5 and 7—7 of FIGS. 4 and 6, respectively.

According to the embodiment of FIGS. 4 and 5, the nozzle 50 includes a lower vertical portion 50a projecting downwardly from the plate 24 and an upper vertical portion 50b projecting above the latter plate. A curved portion 50c connects the upper vertical portion 50b to an additional vertical portion 50d which, as shown in FIG. 5, is spaced from the vertical portion 50b. A horizontal discharge portion 50e is connected at a location approximately midway between its two end portions to the vertical portion 50d. Thus, air from the plenum 26 passes upwardly through the vertical portions 50a and 50b, through the curved portion 50c and downwardly through the vertical portion 50d before entering the horizontal portion 50e. The air discharges in two oppositely directed horizontal directions from the respective end portions of the horizontal portion 50e in a plane parallel to that of the plate 24.

According to the embodiment of FIGS. 6 and 7, a nozzle 52 is provided which includes a lower vertical portion 52a projecting below the plate 24 and an upper vertical portion 52b projecting above the later plate. A curved portion 52c connects the upper vertical portion 52b to an additional vertical portion 52d which is spaced from the vertical portion 52b.

Figure 6:
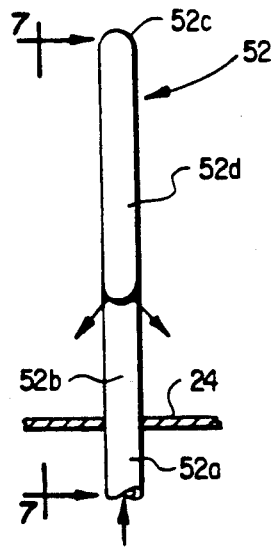
Figure 7:
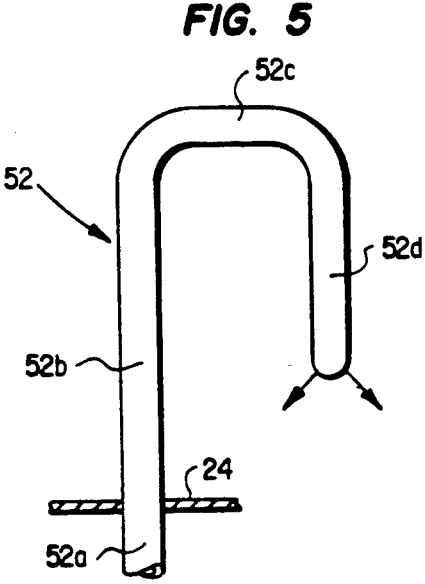

It is understood that a multiplicity of outlet orifices are provided in the end of the vertical portion 52d to discharge of the air in multiple streams extending in the directions shown by the flow arrows in FIGS. 6 and 7, i.e. downwardly at an angle of approximately 45 degrees.

The embodiments of FIGS. 4-7 enjoy all the advantages of the embodiment of FIGS. 1-3 including the prevention of backflow of the particulate material from the fluidized bed 22 to the air plenum 26.

Other variations in the basic inventive concept discharged above can be made without departing from the scope of the invention. For example, the heat exchanger 10 can incorporate a circulating fluidized bed and the nozzle of the present invention can be used in other fluidized bed systems such as stripper coolers, J-valves, seal pots, etc.

Other modifications, changes and substitutions are intended in the foregoing disclosure and in some instances some features of the invention will be employed without a corresponding use of other features. According. it is appropriate that the appended claims be construed broadly and in manner consistent with the spirit and scope of the invention therein.

What is claimed is:

1. A fluidized bed system comprising an enclosure; means for introducing particulate material into said enclosure; a plate disposed in said enclosure and adapted to support said particulate material; a source of air; and a plurality of continuous tubes supported by said plate for receiving said air and directing said air through said plate and into said particulate material to fluidize same; each of said tubes comprising a first generally vertical portion for receiving air from said plenum and extending upwardly from said plate, a curved portion integral with first generally vertical portion for receiving said air from said first generally vertical portion, a second generally vertical portion integral with said curved portion and extending downwardly from said curved portion for receiving said air from said curved portion, and a generally horizontal portion integral with said second generally vertical portion for discharging said air in a plane above said plate.

2. The system of claim 1 wherein said generally horizontal portion extends below the upper portion of said first generally vertical portion.

3. The system of claim 1 where said air is discharged in two directions from said generally horizontal portion.

4. The system of claim 1 wherein said nozzles are oriented so that their respective horizontal portions. discharge air towards one wall of said enclosure.

5. The system of claim 1 wherein said first generally vertical portion also extends downwardly from said plate, and wherein the lower end of said first generally vertical portion receives air from said plenum.

6. A continuous tube for fluidizing a particulate material supported on a plate in an enclosure, said tube comprising a first generally vertical portion extending upwardly from said plate for receiving air, a curved portion integral with said first generally vertical portion for receiving said air from said first generally vertical portion, a second generally vertical portion integral with said curved portion and extending downwardly from said curved portion for receiving said air from said curved portion, and a generally horizontal portion integral with said second generally vertical portion for discharging said air.

7. The system of claim 6 wherein said generally horizontal portion extends below the upper portion of said first generally vertical portion.

8. The system of claim 6 where said air is discharged in two directions from said generally horizontal portion.

9. The system of claim 6 wherein said first generally vertical portion also extends downwardly from said plate, and wherein the lower end of said first generally vertical portion receives air from said plenum.

10. A fluidized bed system comprising an enclosure; means for introducing particulate material into said enclosure; a plate disposed in said enclosure and adapted to support said particulate material; a source of air; and a plurality of continuous tubes supported by said plate for receiving said air and directing said air through said plate and into said particulate material to fluidized same; each of said tubes comprising a first generally vertical portion for receiving air from said plenum and extending upwardly from said plate, a curved portion integral with said first generally vertical portion for receiving said air from said first generally vertical portion, a second generally vertical portion integral with said curved portion and extending downwardly from said curved portion for receiving said air from said curved portion and a multiplicity of orifices provided in the lower end of said second generally vertical portion to discharge said air in multiple streams.

11. The system of claim 10 wherein said orifices are formed to discharge said air downwardly at angles of approximately 45°.

12. The system of claim 10 wherein said first generally vertical portion also extends downwardly from said plate, and wherein the lower end of said first generally vertical portion receives air from said plenum.

13. A continuous tube for fluidizing a particulate material supported on a plate in an enclosure, said tube comprising a first generally vertical portion extending upwardly from said plate for receiving air, a curved portion integral with said first generally vertical portion for receiving said air from said first generally vertical portion, and a second generally vertical portion integral with said curved portion and extending downwardly from said curved portion for receiving said air from said curved portion and for discharging said air through a multiplicity of orifices provided in the lower end of said second generally vertical portion.

14. The continuous tube of claim 13 wherein said orifices are formed to discharge said air downwardly at angles of approximately 45°.

15. The continuous tube of claim 13 wherein said first generally vertical portion also extends downwardly from said plate, and wherein the lower end of said first generally vertical portion receives air from said plenum.

* * * * *